United States Patent [19]

Hahn

[11] 4,390,805

[45] Jun. 28, 1983

[54] ELECTROMECHANICAL MACHINE

[75] Inventor: James H. Hahn, Fort Lauderdale, Fla.

[73] Assignee: David H. Rush, Hollywood, Fla.

[21] Appl. No.: 334,303

[22] Filed: Dec. 24, 1981

Related U.S. Application Data

[63] Continuation of Ser. No. 22,422, Mar. 21, 1979, abandoned, which is a continuation-in-part of Ser. No. 816,610, Jul. 18, 1977, Pat. No. 4,118,556.

[51] Int. Cl.³ .............................................. H02K 21/26
[52] U.S. Cl. ..................................... 310/154; 310/268
[58] Field of Search ............... 310/154, 268, 207, 208, 310/190-206

[56] References Cited

U.S. PATENT DOCUMENTS

| | | | |
|---|---|---|---|
| 294,719 | 3/1884 | Ball | 310/268 |
| 302,319 | 7/1884 | Brush | 310/268 X |
| 3,293,466 | 12/1966 | Henry-Baudot | 310/268 |
| 3,315,106 | 4/1967 | Reynst | 310/268 |
| 3,525,008 | 8/1970 | Burr | 310/268 |
| 3,678,314 | 7/1972 | Carter | 310/268 |
| 3,845,339 | 10/1974 | Merkle et al. | 310/268 X |

Primary Examiner—Donovan F. Duggan
Attorney, Agent, or Firm—Darby & Darby

[57] ABSTRACT

A disc-type motor characterized by increased efficiency is disclosed. The motor has two parallel spaced stator members each having a flat circular shape and an even plurality of pie-segmented permanent-magnet poles in a circular array thereon, illustratively eight in number. The facing poles of the stator members have opposite polarities. The motor includes a disc rotor made of a non-conducting material rotatably mounted between the two stator members. Conducting wires are wound to form a number of coils in a circular array on each face of the rotor. The number of coils on each rotor face is greater than the number of poles on each stator member, and each coil occupies an arc sector area smaller than the area of each stator pole. The coils arrayed on one face of the rotor are angularly offset from the coils on the other face of the rotor. The motor further includes a commutator connected to the rotor which has a number of segments corresponding to the coils of the rotor.

21 Claims, 3 Drawing Figures

ELECTROMECHANICAL MACHINE

This is a continuation, of application Ser. No. 22,422, filed Mar. 21, 1979, now abandoned which is a continuation-in-part of application Ser. No. 816,610, filed July 18, 1977, now U.S. Pat. No. 4,118,556.

BACKGROUND OF THE INVENTION

The present invention relates to electromechanical machinery, and more particularly, to such machinery utilizing a disc-type rotor.

Electrical rotating machines, such as motors or generators, utilizing disc-type rotors are well known in the art. Such machines utilizing wires conventionally wound in laminated or shingle-lapped fashion on the disc rotors are frequently unsatisfactory in that the rotors are undesirably bulky and irregular winding arrangements are required. Arrangement of the wires conventionally into a suitable winding pattern usually takes the form of a crossover of wires thereby resulting in a large air gap between stators and a consequential reduction in flux in the gap.

To overcome the aforementioned disadvantages, printed circuit-type machines have been used in which a conductive pattern is etched or printed on the faces of a thin disc of insulating material to form the armature. An example of a printed disc armature is disclosed in my earlier U.S. Pat. No. 3,096,455 issued on July 2, 1963. This type of motor provides a number of advantages. For example, these machines exhibit virtually no magnetic flux distortion and eddy current induction. The printed circuit armature machines are further advantageous in that they may include a large number of poles without increasing eddy loss and while increasing the back e.m.f. These machines, however, suffer from the disadvantage that, when fabricating a high power machine, the necessary increase in thickness of copper winding is difficult to accomplish with etching techniques. Furthermore, the limitations of etching techniques are such that the minimum obtainable separation between turns in the winding are of the order of twenty to thirty thousandths of an inch. This limits the number of turns of wire which can be provided in a given area. In addition, etching techniques require thin metal conductors, and this increases the resistance of the armature winding. The combination of relatively few turns in a given area combined with relatively high armature resistance results, of course, in a relatively low power machine.

Some disc-type machines employ a single layer of conductor winding to form the armature between a stator and a magnetic closure plate, such as shown in British Pat. No. 1,299,057 issued on Dec. 6, 1972, to Kolimorgen Corporation. Such machines are usually characterized by relatively low power and efficiency. U.S. Pat. No. 2,847,589 issued on Aug. 12, 1958, to A. W. Haydon shows another version of a disc-type machine wherein the coils are wound in flat spirals on both sides of an insulated disc. This type of arrangement produces a relatively low power machine due to the small number of coil turns per stator pole and the low density of copper winding per gap thickness. Other known arrangements can boost the efficiency of small disc-type machines to as high as 75 to 80% by using high-strength alnico or rare earth magnets, but these types of magnets are very costly and increasingly scarce due to shortages in the supply of the constituent elements. High efficiencies of up to 90% have been achieved in larger, high-power lamination-type motors, but these motors are typically of the order of several hundred pounds and deliver relatively low power in proportion to their weight.

SUMMARY OF THE INVENTION

It is, therefore, an important object of the present invention to provide an improved electromechanical machine wherein the aforesaid drawbacks and disadvantages are efficaciously avoided or minimized.

It is a further object of the invention to provide such a machine characterized by low weight, high power, and high efficiency of the order of 90% or greater.

It is yet another object of this invention to provide an electromechanical machine which is characterized by negligible distortion in its magnetic field and eddy losses, and no induction in the coils when shorted upon alignment with the stator poles, whereby a machine of high speed, power, and efficiency is attainable.

It is still another object of the invention to provide an electromechanical machine having a coreless disc-type rotor in which the armature coils on one face of the rotor are offset from and connected in a simple manner with the coils on the other face to a commutator such that the machine has a high efficiency, smooth torque characteristics, and long brush life.

In accordance with the invention, the electromechanical machine comprises first and second stator members spaced apart to form a gap therebetween, each having an even number of P magnetic poles of alternately opposite polarities in a circular array, each pole of the first stator being aligned with an opposite polarity pole of the second stator, an armature rotor between the stator members having a circular array of C coils on each of its front and back faces, the coils on one rotor face being angularly offset from the coils on the other face and C being greater than P such that the arc sector area of each coil is smaller than that of each stator pole, and a commutator rotatable with the rotor for operating the machine. In a preferred embodiment of the invention, the total number (2C) of coils is a multiple of P, and the commutator has 2C segments corresponding to the coils and P brushes for maintaining P parallel conducting pathways among the coils and for shorting P coils upon rotation of the coils into positions of alignment with the stator poles. The magnetic poles are pie-segmented sections of ceramic ferrite permanent magnets arrayed in a circle on each stator member, and each ceramic magnet pole face has a tapered soft iron or steel face cemented thereon for concentrating the magnetic flux of the stator poles.

The machine according to the invention is compact and lightweight, produces relatively high power for its weight and efficiencies of the order of 90% or greater, has smooth torque characteristics, is adaptible to a wide range of uses, and is economical and relatively simple to manufacture. Further, due to the arrangement of the commutator, the machine is durable, enjoys long brush life, and has reduced susceptibility to arcing or shorting at the brushes.

BRIEF DESCRIPTION OF THE DRAWINGS

The foregoing and other objects and features of the present invention will be more clearly understood from the following detailed description thereof when read in conjunction with the accompanying drawings in which.

DESCRIPTION OF THE PREFERRED EMBODIMENT

Figure 1:
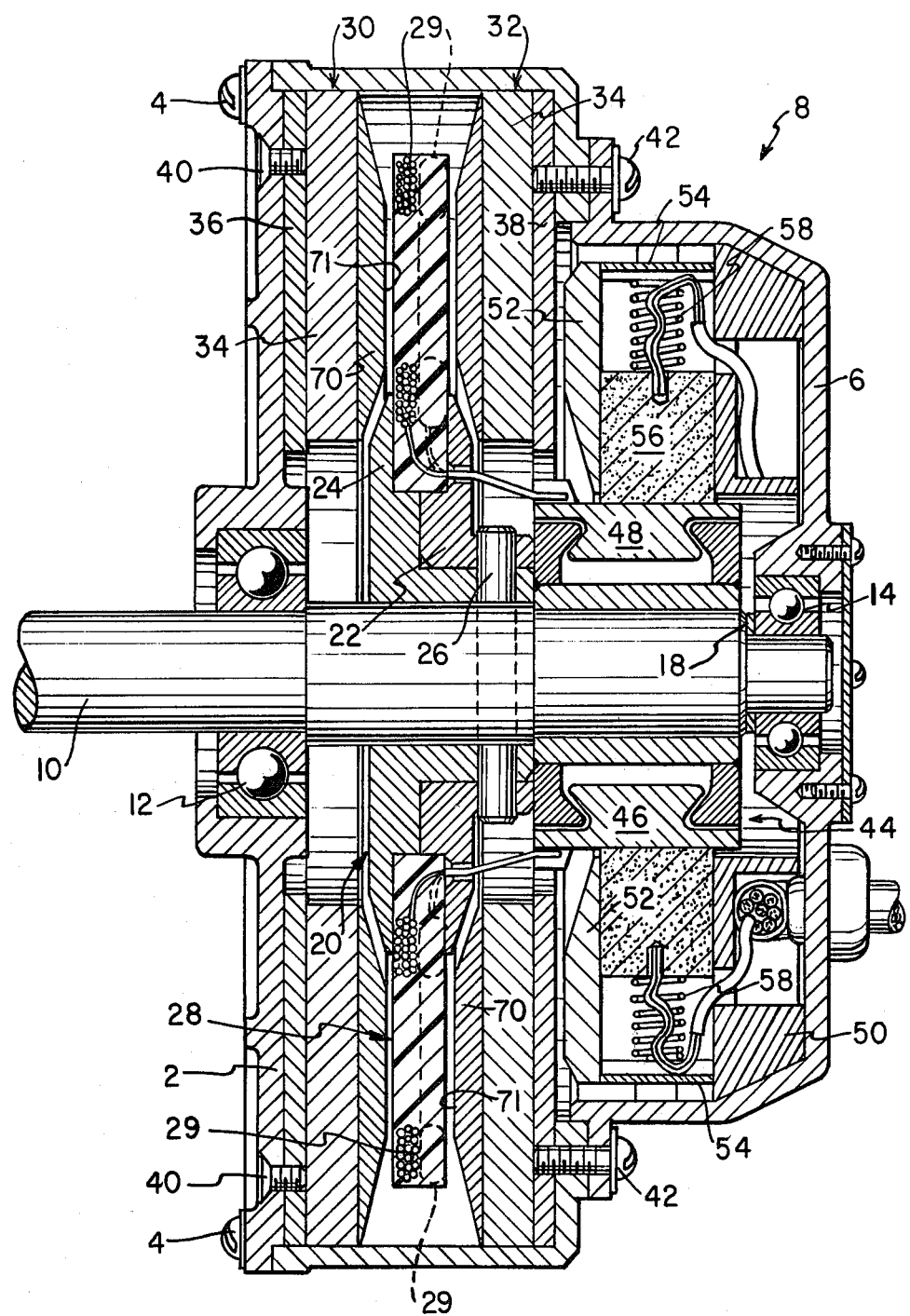
FIG. 1 is an axial cross-sectional view of an electromechanical machine according to the invention.

Turning now to FIG. 1, there is illustrated cross-sectional view of an electromechanical machine utilizing a coreless disc-type armature. A housing-half 2 is connected by any conventional means, for example screws, one of which is indicated at 4, to another housing-half 6 to form the machine housing indicated generally at 8. Rotatably mounted within the housing 8 by means of front bearings 12 and rear bearings 14 is a shaft 10. Washers 16 and 18 are positioned between the shaft 10 and the front and rear bearings, respectively. Within the housing 8 and mounted about the shaft 10 is an armature hub indicated generally at 20 which includes hub-half 22 and hub-half 24. The hub halves 22 and 24 are connected to one another and to the shaft so as to rotate therewith, as by a roll pin 26 passing through the two hub halves and the shaft 10. Suitably secured between the two hub halves 22 and 24 to rotate therewith is a disc-shaped rotor 28 made of a non-conducting, non-magnetic material such as, for example, a phenolic. Secured to the rotor 28 as by adhesive or the like are a plurality of conducting wires forming armature coils 29, which will be more fully discussed below.

Fixedly connected to the machine housing 8 are first and second stator members, indicated at 30 and 32, which are arranged parallel and spaced apart by a narrow gap. Each of the stator members 30 and 32 includes a plurality of flat pie-segmented permanent magnets, indicated at 34, which may, for example, be constructed of relatively inexpensive and lightweight ceramic ferrite. Each of the permanent magnets 34 is magnetized through thickness, so one face is of one polarity and the other face of opposite polarity. The magnets may be fixedly secured by means of an elastic cement, for example, to a metal backing plate in the form of a ring made of soft iron or steel, the two back-up rings being indicated at 36 and 38, respectively. The two back-up rings are fixedly connected to the housing 8 by any conventional means, for example, by countersunk screws, indicated at 40 and 42, respectively. Alternatively, the stators may be formed of ceramic ferrite discs, suitably magnetized at salient areas to form the field poles.

The stator arrangement permits the use of a large number of magnets, for example 6, 8, 10 or more. For a given rotor diameter, gap thickness, rotating speed, and number of coil turns, a greater number of magnetic poles will result in greater e.m.f. as lines of force are cut faster. Due to the necessary separation between adjacent pole faces, slightly less total magnetic area results with a greater number of poles. In larger machines, 10 or 12 stator poles may be used with an overall gain in e.m.f. Furthermore, the greater number of poles provides a greater safety factor against the demagnetizing effect of the armature field.

In the preferred example, the stator pole magnets 34 are made of ceramic ferrite permanent magnets, since the higher strength alnico or rare earth magnets are very expensive and subject to shortages in supply. The individual poles are in pie-segmented sections so that the pole area is maximized. On each ceramic magnet pole face is cemented a flat, soft iron or steel face piece 70 having at its inward face the same shape and area as the ceramic magnet face to which it is mated, but being at its outward face 71 tapered to approximately 40 to 50% of the area though of matching width in a circumferential sense as the underlying ceramic magnet section. This arrangement permits concentration of the magnetic flux to near-saturation and reduction of the corresponding rotor diameter without loss in e.m.f., which results in less windage, shorter wire length per coil, and, accordingly, less resistance and an increase in power and efficiency.

It is also possible to utilize a continuous ring of ceramic ferrite, magnetizing adjacent sections in alternate polarity, thereby further increasing the magnetic area. However, this is less desirable since such a continuous ceramic ferrite structure is frangible and subject to breakage, even when adhered by means of an elastic glue to the magnetic back-up ring. Individual pie-segmented pole pieces are preferred since there is little reduction in total pole area and substantial reduction in the likelihood of breakage. Furthermore, windage losses are reduced substantially with such an arrangement, and consequently better efficiency is obtained.

Fixedly connected to the shaft 10 in FIG. 1 and rotating therewith is a commutator indicated generally at 44. The commutator 44 includes a plurality of segments or bars of a conductive material, such as copper, suitably isolated from one another by, for example, mica. The commutator is also electrically isolated from the armature shaft 10 on which it is mounted. Two of the copper bars of the commutator are indicated at 46 and 48. Fixed to the rear housing 6 is a brush holder mount 50 to which is attached a brush holder 52 and a brush holder clip 54. A brush 56 is positioned between the brush holder 52 and the brush holder clip 54 and is maintained in electrical contact with the commutator bar 46 by a spring 58 positioned between the brush 56 and the brush holder clip 54. Other brushes, as needed, are similarly mounted in relation to the commutator.

Figure 2:
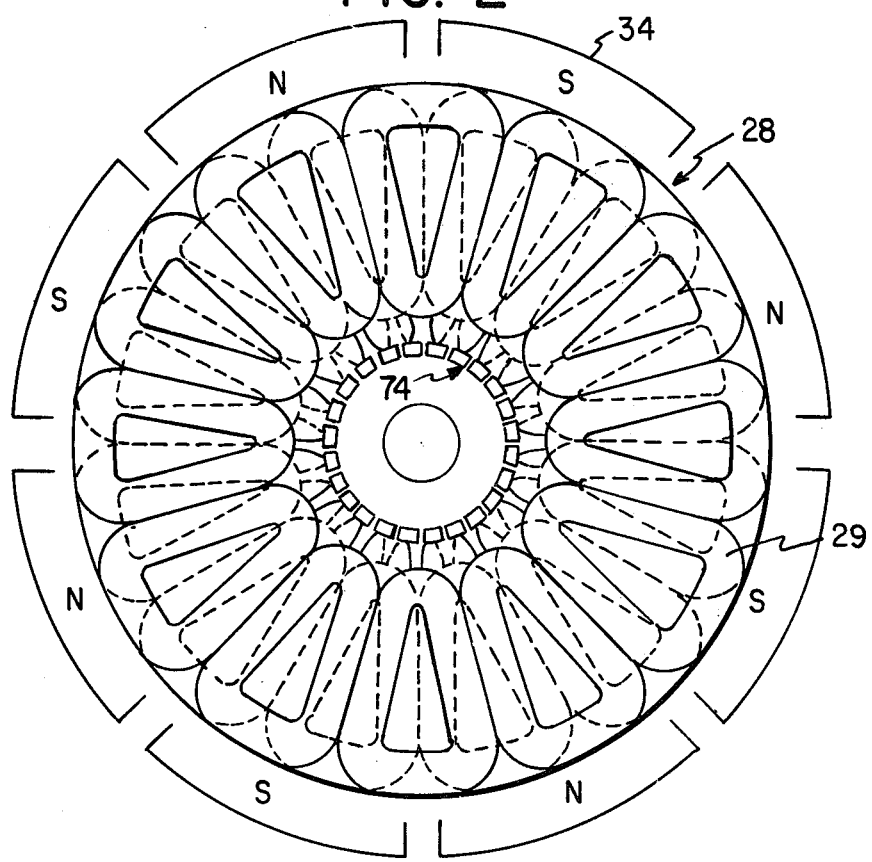
FIG. 2 illustrates one face of an 8 pole, 24 coil disc rotor wound according to the invention with the coils of the other face shown in phantom lines.

Turning now to FIG. 2, the winding pattern for one side of an 8 pole, 24 coil disc rotor is illustrated in relation to the poles 34 of the stator member 32, with the coils of the other side shown in phantom lines. The coils 29 are arrayed in equal arc intervals, 12 coils on each face of the disc rotor 28, and are each wound in random multiple layers to achieve a compact, high density winding for a given rotor size and gap thickness. The winding and overall assembly are thus greatly simplified and, consequently, more durable and reliable. By using fine wire, a great number of turns may be wound in each coil, and a large number of coils may be wound on the rotor faces, for example 18, 24, 30 or more, for higher voltage windings and greater efficiency. For higher power machines, thicker wire may be used with a slightly larger air gap without an offsetting loss in magnetic flux strength.

It will be understood that the coils on one rotor face are angularly offset from the coils of the other rotor face. In the preferred embodiment, they are offset by one half pitch of the coil arc interval. All coils of the rotor winding are wound in the same direction and are connected to a corresponding number of terminals 70 in head-to-tail fashion alternatingly from one side of the rotor then the other, as shown in the upper right-hand quadrant of FIG. 2. By this arrangement, an even wave winding and smooth torque characteristics may be achieved.

In the invention there are more coils on each rotor face than poles on each stator member. Thus, if each stator member has P poles, where P is an even number greater than 1, then the rotor has an array of C coils on each face or 2C coils total where C is any number, odd or even, greater than P. Each coil arc sector area is therefore smaller than each pole area, and each coil, when shorted upon alignment with the stator poles, thus lies within the pole area such that any induction in the coil is prevented. This results in an absence of arcing at the brushes, longer component life, the possibility of operating the machine at high speeds, and, therefore, high efficiency. Further advantages are realized in the connection of the coils with the commutator, as explained further herein.

In the preferred form of the invention, the total number of coils 2C is a multiple of the number P of poles. The described embodiment of FIGS. 1 and 2 illustratively has 8 stator poles and 24 coils arrayed on both sides of the rotor. In smaller machines, for example, 6 stator poles may be used with 18 rotor coils (9 on each side). For larger traction motors, 10 or 12 stator poles may be used with 30 or 36 coils on the rotor (15 or 18 on each side). The multiple number of total coils to poles results in an even wave winding and smooth torque characteristics.

In this preferred embodiment, all coils have the same number of turns. This is not essential and the coils may have different numbers of turns, although it is preferable that each pair of diametrically opposite coils on the same rotor face should have the same number of turns. Preferably, the wire used for winding has a thermoplastic or resin coating, for example epoxy, such that the turns can be fused together in a unified body. Additionally, the wound coils may be enclosed by a further epoxy layer to produce a durable, integrated winding structure. This arrangement also permits the armature coils to pass very close to the stator magnet surfaces on both sides of the rotor disc thus allowing a greater density of copper winding in the stator gap, with the resultant increase in horsepower for a given size and corresponding increase in efficiency. The described coreless armature rotor is lightweight and utilizes no iron or ferrite materials, such that there are virtually no armature reaction when used in servo or reversible motors, hysteresis effects, eddy losses, or necessity for advancing the commutator brushes under load conditions. Furthermore, the resultant machine may be operated at high rotational speeds for greater horsepower and efficiency.

Figure 3:
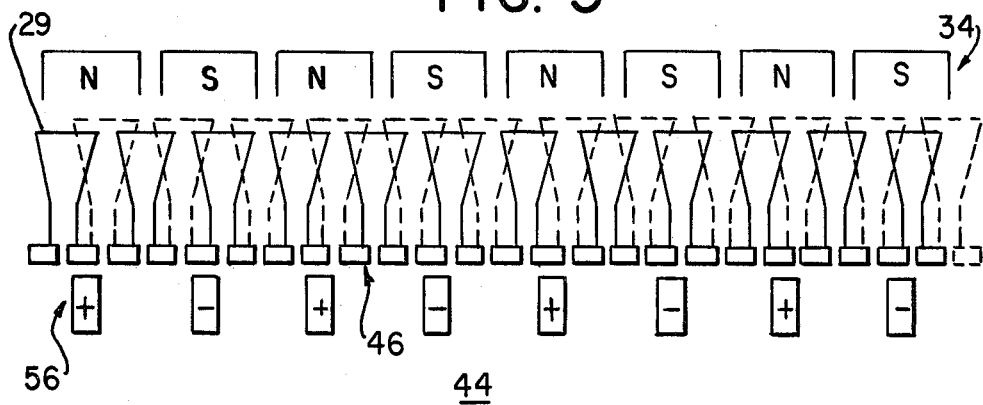
FIG. 3 is a schematic diagram of a commutator arranged for use with the disc rotor illustrated in FIG. 2.

Turning now to FIG. 3, there is illustrated a schematic diagram of a commutator 44 for use with the armature rotor such as illustrated in FIGS. 1 and 2. The commutator has a number of segments or bars 46 corresponding to the total number of coils, in the described embodiment 24 segments. The segments 46 are connected to the corresponding coils 29 in head-to-tail fashion as described previously. In FIG. 3 the coils 29 in solid line represent coils on the rotor face of FIG. 2, and those in broken line correspond to coils on the rear face shown in phantom in FIG. 2. The coils 29 are further shown in relation to the stator poles 34 and to the commutator brushes 56, here 8 in number corresponding to the number of stator poles. The arrangement serves to maintain 8 parallel conducting paths among the coils and to short the coils as they are moved through positions of alignment with the stator poles. This is a simplified construction of high efficiency. It will be understood further that in the invention use of 2C commutator segments with P brushes ensures that a minimum of two segment spacings will separate each pair of full voltage brush contact points. The possibility of shorting and ring fire due to fragments or particles between segments is thus significantly reduced. Instead of 8 brushes used in the described embodiment, a lesser even number of brushes may be used in light-duty machines in conjunction with bridging corresponding commutator segments with an appropriate series of jumper connections. The jumper connections preferably are in the form of stamped brass rings with insulation cemented to one side and tabs to contact appropriate segments. Such rings may be conveniently pressed in place in order to simplify assembly of the machine.

The present invention thus provides a compact, lightweight, high-efficiency electromechanical machine which may be used in a wide range of applications. Such machines can operate at three or more times the speed of laminated armature motors and at $\frac{1}{8}$ to 1/10 the weight. Due to high ratio of horsepower to weight and the small amount of costly materials required, these machines are also very economical and easy to assemble and produce. Efficiencies of 75 to 80% in smaller machines, and of 85 to 90% and as high as 93% in larger machines, depending on size and speed, are attainable. Furthermore, the elimination of induction in shorted coils and the spacing between commutator brushes ensure very long brush life even for operation at high speeds. Also, the same machine may serve either as a motor or a generator, and may be arranged to employ a drum rather than disc-type rotor, although this is not the preferred form of practicing the invention.

It will be understood that the foregoing description of the preferred embodiment of the present invention is for purposes of illustration only, and that the various structural and operational features as herein disclosed are susceptible to a number of modifications and changes none of which entail any departure from the spirit and scope of the present invention as defined in the appended claims.

What is claimed is:

1. An electromechanical machine comprising:
   first and second stator members spaced apart to form a gap therebetween, each having a circular array of P magnetic poles of alternately opposite polarity, P being an even integer, each pole of each stator member occupying a substantially equal pole arc sector of the circular array and being aligned opposite an opposite-polarity pole of the other stator member,
   an armature rotor between the stator members having a non-overlapping, circular array of C coils on each of the front and back face thereof, C being an integer greater than P, the coil array on one rotor face being angularly offset relative to the coil array on the other rotor face, each coil of each rotor face occupying a substantially equal coil arc sector smaller than a pole arc sector; and
   a commutator rotatable with the rotor.

2. The electromechanical machine according to claim 1, wherein C is an integer such that 2C is a multiple of P.

3. An electromechanical machine comprising:
   first and second stator members spaced apart to form a gap therebetween, each having a circular array of P magnetic poles of alternately opposite polarity, P being an even integer, each pole of each stator member occupying a substantially equal pole arc sector of the circular array and being aligned opposite an opposite-polarity pole of the other stator member, an armature rotor between the stator members having a non-overlapping, circular array of C coils on each of a front and back face thereof, C being an integer greater than P, the coil array on one rotor face being angularly offset relative to the coil array on the other rotor face, each coil of each rotor face occupying a substantially equal coil arc sector smaller than a pole arc sector, and a commutator rotatable with the rotor, the commutator having 2C segments, the 2C coils of the rotor faces being connected, in head-to-tail fashion alternatingly of one rotor face then the other, to the 2C commutator segment.

4. The electromechanical machine according to claim 3, wherein C is an integer such that 2C is a multiple of P.

5. The electromechanical machine according to claim 4, further comprising electrical contact means including P brushes in conjunction with the commutator for maintaining P parallel conducting pathways among the 2C coils and for shorting P coils upon rotation into positions of alignment with the poles of the stator members.

6. The electromechanical machine according to claim 1, further comprising electrical contact means in conjunction with the commutator for maintaining P parallel conducting pathways among the 2C coils and for shorting the coils upon rotation into positions of alignment with the poles of the stator members.

7. The electromechanical machine according to claim 3, further comprising electrical contact means including brushes arranged in relation to the 2C commutator segments such that a minimum of two spacings between commutator segments is between adjacent brushes.

8. The electromechanical machine according to claim 1, wherein the coils are each wound with wire in the same direction in random multiple layers.

9. The electromechanical machine according to claim 8, wherein the wire is coated with a thermoplastic or resin material, and each coil is fused into a unified body.

10. The electromechanical machine according to claim 1, wherein the coil arrays on the rotor faces are enclosed in a protective layer of thermoplastic or resin material.

11. The electromechanical machine according to claim 1, wherein the stator members are flat, circular, and spaced apart parallel to each other, each member including a backing plate and the array of magnetic poles being provided by a corresponding plurality of permanent magnets arranged in a circular array on the backing plate, each of the magnets occupying a pie-segmented arc sector area with a relatively small separation between it and adjacent magnets, and further wherein the rotor is a disc rotatable in the gap between the spaced apart parallel stator members.

12. The electromechanical machine according to claim 11, wherein each of the array of pie-segmented magnets is a ceramic ferrite permanent magnet having on an outward face thereof a soft iron or steel face piece facing the coils on the rotor.

13. The electromechanical machine according to claim 12, wherein said face piece is tapered such that its area facing the coils is smaller than the arc sector area but its width in a circumferential sense matches that of the underlying magnet.

14. The electromechanical machine according to any one of claims 5-7 wherein said electrical contact means comprises:

2C conductive and electrically isolated commutator segments spaced apart in a substantially circular arrangement on said commutator, each of said coils being connected between a pair of adjacent commutator segments;

P brushes positioned in spaced arrangement so as to contact each of said commutator segments in turn during operation of said machine, each of said brushes being dimensioned to be wider than the spacing between adjacent commutator segments, each of said brushes being positioned with respect to a corresponding pole so that the pair of commutator segments corresponding to a single coil are short circuited by said brush as said coil is rotated into a position of alignment with respect to the corresponding pole, said coils being short circuited by a brush as they move into alignment with the corresponding pole and being in series circuit between adjacent brushes, the circuits between adjacent brushes forming P parallel conducting pathways.

15. An electromechanical machine comprising:

first and second magnetic members spaced apart to form a gap therebetween, each having a circular array of P magnetic poles of alternately opposite polarity, P being an even integer, each pole of each magnetic member occupying a substantially equal pole arc sector of the circular array and being aligned opposite an opposite-polarity pole of the other magnetic member;

an electrical member between the magnetic members having non-overlapping, circular array of C coils on each of the front and back face thereof, C being an integer greater than P, the coil array on one electrical member face being angularly offset relative to the coil array on the other electrical member face, each coil of each electrical member face occupying a substantially equal coil arc sector smaller than a pole arc sector;

said magnetic members and said electrical member being mounted for relative rotation; and a commutator mounted so as to be non-rotatable with respect to the electrical member and rotatable with respect to the magnetic members.

16. An electromechanical machine comprising:

first and second magnetic members spaced apart to form a gap therebetween, each having a circular array of P magnetic poles of alternately opposite polarity, P being an even integer, each pole of each magnetic member occupying a substantially equal pole arc sector of the circular array and being aligned opposite an opposite-polarity pole of the other magnetic member;

an electrical member between the magnetic members having non-overlapping, circular array of C coils on each of the front and back face thereof, C being an integer greater than P, the coil array on one electrical member face being angularly offset relative to the coil array on the other electrical member face, each coil of each electrical member face occupying a substantially equal coil arc sector smaller than a pole arc sector;

said magnetic members and said electrical member being mounted for relative rotation;

a commutator mounted so as to be non-rotatable with respect to the electrical member and rotatable with respect to the magnetic members;

said electrical member having 2C segments, the 2C coils of the electrical member faces being connected in head-to-tail fashion alternatingly of one electrical member face than the other, to the 2C commutator segments.

17. The electromechanical machine according to claim 16 wherein C is an integer such that 2C is a multiple of P.

18. The electromechanical machine according to claim 17, further comprising electrical contact means including P brushes in conjunction with the commutator for maintaining P parallel conducting pathways among the 2C coils and for shorting P coils upon the relative rotation bringing said P coils into positions of alignment with the poles of the magnetic members.

19. The electromechanical machine according to claim 15, further comprising electrical contact means including P brushes in conjunction with the commutator for maintaining P parallel conducting pathways among the 2C coils and for shorting P coils upon the relative rotation bringing said P coils into positions of alignment with the poles of the magnetic members.

20. The electromechanical machine according to claim 16, further comprising electrical contact means including brushes arranged in relation to the 2C electrical member segments such that a minimum of two spacings between electrical member segments is between adjacent brushes.

21. The electromechanical machine according to any one of claims 18–20 wherein said electrical contact means comprises:

2C conductive and electrically isolated commutator segments spaced in a substantially circular arrangement on said commutator, each of said coils being connected between a pair of adjacent commutator segments;

P brushes positioned in spaced arrangement so as to contact each of said commutator segments in turn during operation of said machine, each of said brushes being dimensioned to be wider than the spacing between adjacent commutator segments, each of said brushes being positioned with respect to a corresponding pole so that the pair of commutator segments corresponding to a single coil are short circuited by said brush as said coil and the corresponding pole are relatively rotated into a position of alignment; and said coils being short circuited by a brush as said relative rotation into alignment occurs and being in series circuit between adjacent brushes, the circuits between adjacent brushes forming the P parallel conducting pathways.

* * * * *